Aug. 9, 1960
W. S. BARNHART ET AL
2,948,741
RECOVERY OF TELOMER ACID
Filed March 21, 1956
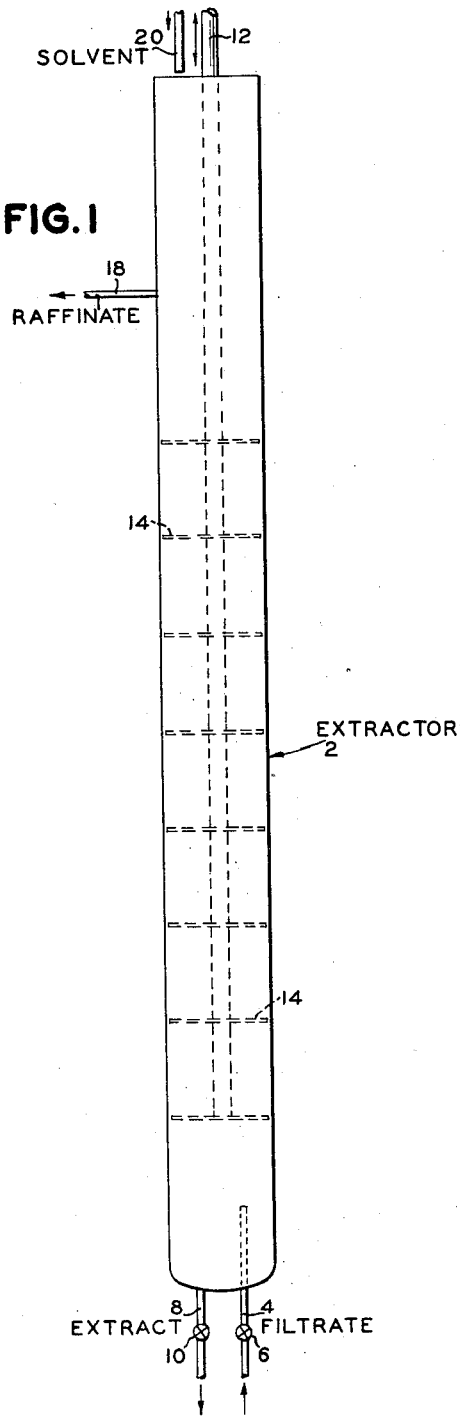
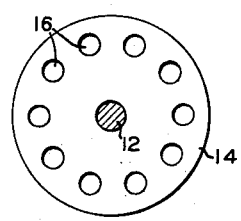
INVENTORS
WILLIAM S. BARNHART
CHARLES W. WEBER
BY
ATTORNEYS

United States Patent Office 2,948,741
Patented Aug. 9, 1960

2,948,741

RECOVERY OF TELOMER ACID

William S. Barnhart, Cranford, and Charles W. Weber, Jersey City, N.J., assignors, by mesne assignments, to Minnesota Mining and Manufacturing Company, St. Paul, Minn., a corporation of Delaware Filed Mar. 21, 1956, Ser. No. 572,852

9 Claims. (Cl. 260—408)

This invention relates to the recovery of telomer acids, i.e., perchlorofluorocarboxylic acids used as emulsifiers in emulsion polymerization systems. The process provides a means for the recovery of small quantities of acid, i.e., between about 0.1 and about 2 percent by weight based upon the polymer filtrate. The acids recovered are those found in the water filtrates of the polymer products and those found in the wash water used to wash the polymer products.

In copending application Serial No. 463,073, filed October 18, 1954, now Patent No. 2,874,152, there is disclosed a process for the polymerization of various perhaloolefins such as chlorotrifluoroethylene in the presence of an aqueous suspension medium to produce a normally solid polymer of high physical and chemical stability. In copending application Serial No. 546,198, filed November 10, 1955, there is disclosed a chemical process and plant design for the emulsion polymerization of various polymerizable ethylenically unsaturated monomers, and in both of the processes of these copending applications a loss of the acid emulsifier results unless the filtrates and water washes are treated in accordance with the present invention to recover the perchlorofluorocarboxylic acid emulsifier therefrom. This problem is greatly magnified, of course, in the case of the process disclosed in copending application Serial No. 546,198, due to the large quantities of materials handled therein and the resulting larger loss of acid emulsifier in the filtrates and wash water.

In addition to the recovery of perchlorofluoromonocarboxylic acids disclosed in the two aforementioned copending applications, the process of the present invention may also be used to recover perchlorofluoropolycarboxylic acids, such as those disclosed in copending application Serial No. 493,554, filed March 10, 1955, now Patent No. 2,856,388, from dilute solutions thereof.

In the process of the present invention, after the coagulation of a latex polymerized in an emulsion polymerization system which may include, for example, one or more monomers, water, potassium persulfate, $Na_2HPO_4$, and a telomer acid such as one having the formula

$$Cl(CF_2-CFCl)_3CF_2COOH$$

the coagulated latex is filtered and washed. The polymer is removed and a clear filtrate including water, inorganic salts, and about 0.1 to about 1.5 percent by weight of telomer acid salt remains. The concentration of the telomer acid salt in the filtrate may be as high as about 2 percent and as low as about 0.1 percent by weight depending upon the amount of washing employed, and below 0.01 percent by weight it is uneconomical to attempt recovery of the telomer acid. It is, therefore, desirable to recover as much of the telomer acid as is economically feasible as the emulsifier is an expensive additive.

The telomer acid emulsifier is recovered in accordance with the present invention by the addition of sufficient sulfuric or phosphoric acid to the filtrate or wash water or mixture thereof to form a solution of about 1 to 10 percent by weight of the added mineral acid. The addition of the acid results in the formation of a hazy quantitative precipitate or colloidal suspension which is observed as a Tyndall effect. The colloidal suspension may then be removed or separated from the aqueous suspending medium by centrifugation in a continuous centrifuge resulting in a recovery of about 85 to 95 percent of the acid which is then distilled, or the colloidal suspension may be separated by solvent extraction using a solvent to filtrate weight ratio of about 1 to 40 to about 1 to 5, preferably 1 to 20 to 1 to 10. Suitable solvents which may be used are those such as 1,1,2-trichlorotrifluoroethane, chloroform, carbon tetrachloride, benzene, methylene chloride, and the like. About 90 to 98 percent of telomer acid may be recovered by the solvent extraction procedure, and it is then distilled. Methylene chloride is not as desirable a solvent as the others listed as it apparently extracts some sulfuric or phosphoric acid with a possible formation of aldehydes upon heating, resulting in a dark color being imparted to the telomer acid prior to distillation.

One continuous extraction procedure which may be used in the process of the present invention includes bubbling the colloidal suspension into the bottom of a tank containing two immiscible layers, the lower layer being a solvent layer and the upper layer being an aqueous phase. The colloidal telomer acid dissolves in the solvent and at intervals a portion of the solvent layer rich in recovered telomer acid is drawn off and additional solvent is added to the tank. An overflow of the aqueous upper phase is removed intermittently or continuously from the top of the tank. The solvent rich in telomer acid is then distilled to recover the acid in pure form.

Referring to the accompanying drawing,

Figure 1 is a diagrammatic view in elevation of one type of extractor, and

Figure 2 is a view in detail of one of the plates used in the extractor. The apparatus includes an elongated cylindrical vessel 2 having the inlet line 4 at the lower end thereof through which a filtrate having a colloidal suspension of telomer acid therein is introduced into the vessel 2. The inlet 4 is provided with the valve 6 and the extract outlet 8 also positioned at the lower end of the vessel 2 is similarly provided with a valve 10.

A reciprocating rod 12 extends into the vessel 2 and has a plurality of circular plates 14 secured thereto.

As will be seen from Figure 2 of the drawing, the circular plates 14 are provided with a plurality of apertures 16 for the passage of fluid therethrough. Raffinate is removed from the vessel 2 through the line 18 and additional solvent is added to the vessel 2 through the top thereof, as shown at 20.

When this extractor is operated in a continuous manner, filtrate is introduced through the line 4 while solvent is introduced through the top of the vessel through the line 20. The reciprocation of the rod 12 and the plates 14 results in the colloidal suspension of telomer acid becoming dissolved in the solvent and an extract phase rich in telomer acid is withdrawn through the line 8, while an aqueous raffinate phase is withdrawn through the line 18. When the extractor is operated in a batch-wise manner, the vessel 2 is filled with filtrate and solvent is then added through the top of the vessel as shown in 20, and after the required residence time the acid-rich extract is withdrawn from the bottom and separated from the aqueous phase which is discarded.

The invention will be further illustrated by reference to the following specific examples:

EXAMPLE 1

A series of studies was made on salting out of telomer acids followed by batch centrifugation using 100 ml. quantities of 0.5 weight percent of telomer acid solutions containing $K_2S_2O_8$ and $Na_2HPO_4$. The telomer acid had the formula $$Cl(CF_2\text{---}CFCl)_3CF_2COOH$$

The telomer acid salted out in an acid medium and the acid salt separated in a neutral or basic medium.

The results are tabulated in Table 1 below:

*Table 1.—Telomer acid recovery by salting out followed by batch centrifugation*

| Run No. | Conc. $H_2SO_4$ ml./100 ml. | NaCl (g.) | Conc. HCl, ml. | 30 mins. at r.p.m. | Btm. Layer, ml. | Top Layer (pH) | Top Layer ml. | Wt. Percent $C_8$ Acid Removed from top layer |
|---|---|---|---|---|---|---|---|---|
| 1 | | 4.8 | | 1,800 | 0.7 | (6) | 100 | 62.7 |
| 2 | 0.1 | 4.8 | | 1,800 | 0.4 | (1) | 100 | 77.2 |
| 3 | 0.1 | 3.6 | | 1,800 | 0.7 | (1) | 100 | 11.1 |
| 4 | 0.1 | 2.4 | | 1,800 | 0.7 | (1) | 100 | 4.3 |
| 5 | | 9.6 | | 1,500 | 0.5 | (6) | 100 | a 90.0 |
| 6 | 4.0 | | | 1,500 | 0.45 | (1) | 103 | 95.0 |
| 7 | 3.0 | | | 1,800 | 3.0 | (1) | 100 | b 83.5 |
| 8 | 2.0 | | | 1,800 | c 36.0 | (1) | 66 | b 78.8 |
| 9 | | | 2.0 | 1,800 | c 49.0 | (1) | 53 | b 68.5 |
| 10 | | | 4.0 | 1,800 | c 38.0 | (1) | 66 | b 80.9 |
| 11 | | (5.0 g. NaOH) | | 1,500 | 0.55 | (11) | 100 | a 76.0 | a Fine solid floating on upper surface of top layer—filtered off and added to bottom.
b Calculation example:

$0.4882$ g. $C_8$/original system $\times \frac{66}{102} = 0.316$ g. $C_8$;

Analysis: 0.067 g. $C_8$; 0.316−0.067=0.249 g. removed;

$\frac{.249}{.316} \times 100 = 78.8$ wt. percent revomed from top layer.

c Separate aqueous phase rich in telomer acid.

EXAMPLE 2

The centrifugation of telomer acid mixtures on a continuous basis was performed in a Sharples Supercentrifuge under the following conditions:

(1) Feed of 0.2 weight percent $C_8$ aqueous $$Cl(CF_2\text{---}CFCl)_3CF_2COOH$$

solution containing $K_2SO_4$ and $Na_2HPO_4$.

(2) Air driven turbine: 38,000 r.p.m. at 25 p.s.i., 28,000 r.p.m. at 15 p.s.i.

(3) Stainless steel construction.

(4) Volume of liquid in bowl: 325 ml. (static calibration), 168 ml. (28,000 r.p.m.)

(5) Feed nozzle orifice, 0.039 inch diameter.

(6) Differential liquid feed head: 15 inch maximum, 3 inch minimum.

(7) Centrifuge was operated as a "clarifier" with a No. 5 dam.

(8) Bowl stopped spinning 5.62 minutes after air delivery to turbine ceased.

The results of these runs are tabulated in Table 2 below:

*Table 2.—Telomer acid recovery by salting out followed by continuous centrifugation*

| Run No. | Feed Vol. percent conc. $H_2SO_4$ | Feed ml. | Feed Rate, ml./min. | Feed $C_8$ Acid, gms. | Effluent ml. | Effluent $C_8$ Acid, gms.a | Effluent Vol. Percent fog loss | Weight Percent Recoveryb |
|---|---|---|---|---|---|---|---|---|
| 1 | 2 | 1020 | 150 | 2.253 | 990 | 0.230 | 2.9 | 89.8 |
| 2 | 3 | 1030 | 149 | 2.253 | 995 | 0.130 | 3.4 | 94.2 |
| 3 | 4 | 1040 | 150 | 2.253 | 1010 | 0.077 | 2.9 | 96.5 | a Analysis by s-Benzylthiuronium Chloride Ppt'n.
b Gelatinous residue in bowl: 16.8 gms. ≈ 5.31 gms. $C_8$ acid or 78.6 wt. percent of acid in feed, plus gelatinous residue in feed tank and feed lines at end of experiment.

It is apparent that 95 percent by weight of the telomer acid was recovered by this method. The gelatinous telomer acid precipitate was recovered from the bowl of the centrifuge by scraping or by extraction with a solvent such as 1,1,2-trichlorotrifluoroethane or hot water. Centrifuge effluents were both liquid and gaseous.

EXAMPLE 3

A series of studies of solvent extraction of salted out telomer acid mixtures is summarized in Table 3 below. In these runs exactly 100 ml. of a solution containing 0.48 weight percent of $C_8$ telomer acid, having the formula $$Cl(CF_2-CFCl)_3CF_2COOH$$

$K_2S_2O_8$ and $Na_2HPO_4$ were acidified. The extraction solvent was added and mixed by shaking for three minutes in a 125 ml. graduated separatory funnel. After separation, the top layer was analyzed for telomer acid by the s-benzyl thiuronium salt method. The telomer acid recovered from a 2 volume percent sulfuric acid mixture by solvent extraction was 97.6 weight percent as compared with 78.8 weight percent recovery by batch centrifugation (Table 1, run No. 8).

*Table 3.—Telomer acid recovery by salting out with batch extraction*

| Run. No. | Conc. H₂SO₄, ml. | Extractant | | Raffinate | | Extract | | Recovery Weight Percent C₈ acid |
|---|---|---|---|---|---|---|---|---|
| | | Compd. | ml. | ml. | gms. C₈ Acid [a] | ml. | gms. C₈ Acid [b] | |
| 1 | 4 | CCl₄ | 10 | [c] 101.5 | 0.0035 | [c] 11.5 | 0.4765 | 99.2 |
| 2 | 4 | CCl₄ | 5 | [c] 104.0 | 0.0096 | [c] 5.0 | 0.4704 | 98.0 |
| 3 | 2 | CCl₄ | 10 | [c] 100.5 | 0.0116 | [c] 11.5 | 0.4684 | 97.6 |
| 4 | 4 | CCl₂=CHCL | 10 | [c] 102.0 | 0.0098 | [c] 11.0 | 0.4702 | 98.0 |
| 5 | 4 | 1,1,2-trichlorotrifluoroethane. | 10 | [d] 102.0 | 0.004 | [d] 11.0 | 0.476 | 99.1 |

[a] Analysis by s-Benzylthiuronium chloride ppt'n.
[b] by difference; example: 0.4800−0.0035=0.4765.
[c] turbid solution.
[d] clear solution.

EXAMPLE 4

In the polymerization of $CF_2=CFCl$ the following recipe was charged to an autoclave:

| | |
|---|---|
| $CF_2=CFCl$ | 100 parts or 10 kg. or 22 lbs.=2 gal. |
| $H_2O$ | 300 parts or 30 kg. or 66 lbs.=8 gal. |
| $K_2S_2O_8$ | 2.4 parts or 0.24 kg. or 0.528 lb. |
| $C_8$ telomer acid $Cl(CF_2-CFCl)_3CF_2COOH$ | 4.5 parts or 0.45 kg. or 0.99 lb. |
| $Na_2HPO_4$ | 4.8 parts or 0.48 kg. or 1.056 lbs. |

The polymerization took place at 25° C. under about 7 atm. pressure. A portion of the resulting latex was frozen, allowed to melt, centrifuged, and washed with water. The initial water and mother liquor was collected and analyzed.

| Fraction | Wt. of Soln., kg. | Conc. Telomer Acid, percent | Amt. Telomer Acid, g. |
|---|---|---|---|
| 1) mother liquor +1.11 kg. H₂O | 8.16 | 0.262 | 21.4 |
| 2) wash | 4.95 | 0.245 | 12.0 |
| 3 | 8.92 | 0.482 | 43.0 |
| 4 | 13.06 | 0.244 | 32.5 |
| 5 | 9.26 | 0.112 | 10.4 |
| 6 | 5.08 | 0.097 | 4.9 |
| 7 | 4.89 | 0.085 | 4.2 |
| 8 | 4.55 | 0.092 | 4.2 |

Fraction 4 above was acidified to a pH of 1.3 with $H_2SO_4$ and 1924 ml. of the resulting solution was extracted with 285 ml. of $CH_2Cl_2$ in the extractor disclosed in Figures 1 and 2 of the drawing which had a length of 4.5 ft., a tube or vessel diameter of 52 mm., a 45 mm. spacing between plates and a stroke of 31 mm. The circular plates were 50 mm. in diameter, the apertures therein were 5 mm. in diameter and the plates were 4 mm. in thickness. The rod and plates were reciprocated at a rate of 130 strokes per minute. Methylene chloride was added continuously during 20 minutes of agitation. The results were as follows:

| | |
|---|---|
| Initial conc. of telomer acid | percent 0.244 |
| Final conc. of telomer acid | do 0.001 |
| Amt. of telomer acid in $CH_2Cl_2$ | g 4.5 |

This represents about 99.6 percent recovery.

EXAMPLE 5

The general procedure of Example 4 above was followed except that 315 ml. of $CH_2Cl_2$ for 1922 ml. of solution were used during a 10 minute extraction operation.

| | |
|---|---|
| Initial conc. of telomer acid | percent 0.244 |
| Final conc. of telomer acid | do 0.001 |
| Amt. of telomer acid in $CH_2Cl_2$ | g 4.40 |

This represents a 99.6 percent recovery.

EXAMPLE 6

The procedure outlined in Example 4 was followed except that 205 ml. of $CH_2Cl_2$ for 1938 ml. of solution were used durring a 5 minute extraction period.

| | |
|---|---|
| Initial conc. of telomer acid | 0.244 percent. |
| Final conc. of telomer acid | 0.001 percent. |
| Amt. of telomer acid in $CH_2Cl_2$ | 4.37 g. or 99 percent recovery. |

EXAMPLE 7

The acidified solution of fraction 4 in Example 4 (1928 ml.) was extracted with 255 ml. of $CH_2Cl_2$ in the extractor described in Example 4, at a rate of 61 strokes per minute. The methylene chloride was added continuously during 20 minutes of agitation. The results were as follows:

| | |
|---|---|
| Initial conc. of telomer acid | 0.244 percent. |
| Final conc. of telomer acid | <0.001 percent. |
| Amt. of telomer acid in $CH_2Cl_2$ | 4.5 g. or 99 percent recovery. |

EXAMPLE 8

The procedure outlined in Example 7 was followed except that 155 ml. of $CH_2Cl_2$ for 1920 ml. of acidified solution were used during a 10 minute extraction period.

| | |
|---|---|
| Initial conc. of telomer acid | 0.244 percent. |
| Final conc. of telomer acid | 0.005 percent. |
| Amt. of telomer acid in $CH_2Cl_2$ | 4.225 g. or 99 percent recovery. |

EXAMPLE 9

The polymerization recipe used in Example 4 was used again and the resulting latex was coagulated, centrifuged, and washed. The washings and mother liquor were analyzed.

| Fraction | Wt. of Soln., kg. | Conc. Telomer Acid, percent | Amt. Telomer Acid, g. |
|---|---|---|---|
| 1 (mother liquor) | 15.80 | 0.358 | 56.6 |
| 2 | 24.00 | 0.361 | 86.5 |
| 3 | 24.45 | 0.066 | 16.0 |
| 4 | 24.30 | 0.022 | 5.44 |
| 5 (mother liquor) | 13.72 | 0.401 | 55.0 |
| 6 | 25.60 | 0.491 | 125.7 |
| 7 | 27.60 | 0.106 | 29.3 |
| 8 | 26.70 | 0.043 | 11.5 |

A portion (15.805 kg.) of fraction 6 above was added at the rate of about 77 ml. per minute to the extractor described in Example 4 operating at 61 strokes per minute. $CH_2Cl_2$ was added simultaneously at about 12 ml. per minute. The concentration of telomer acid in water was 0.026 percent and the amount of acid recovered was 81.399 g. or about 99 percent.

EXAMPLE 10

Filtrate (17,300 ml.) and wash liquid containing 35.5 g. of $C_8$ telomer acid, $Cl(CF_2—CFCl)_3CF_2COOH$, was acidified with 692 ml. of $H_2SO_4$ to give a total of 17,992 ml. of solution. This acidified solution was passed through a centrifuge bowl (static volume 325 ml., operating liquid volume 168 ml.) at a rate of 150 ml. per minute at a speed of 28,000 r.p.m. The centrifuged effluent (17,470 ml.) contained 4.63 g. of telomer acid. The solid material was separated from the bowl and extracted with three 100 ml. washes of $CH_2Cl_2$ solution. The resulting solution was then distilled and 29.18 grams of $C_8$ telomer acid distillate were recovered. (Pot residue analysis showed 2.24 grams of telomer acid.) A total of 31.42 grams or 87 percent of telomer acid was recovered.

It will be obvious to those skilled in the art that many modifications may be made within the scope of the present invention without departing from the spirit thereof, and the invention includes all such modifications.

We claim:

1. A method for the recovery of a perchlorofluoroalkyl carboxylic acid from a dilute aqueous solution containing at least 98 percent by weight of water which comprises adding to said dilute aqueous solution a member of the group consisting of sulfuric and phosphoric acids in sufficient quantity to form a solution of about 1 to 10 percent by weight of added acid, thereby precipitating the perchlorofluoroalkyl carboxylic acid, and separating the precipitate.

2. A method for the recovery of a perchlorofluoroalkyl carboxylic acid having the formula $$Cl(CF_2—CFCl)_{n-1}CF_2COOH$$

wherein $n$ is an integer from 2 to 16, from a dilute aqueous solution containing at least 98 percent by weight of water which comprises adding to said dilute aqueous solution a member of the group consisting of sulfuric and phosphoric acid in sufficient quantity to form a solution of about 1 to 10 percent by weight of added acid, thereby precipitating the perchlorofluoroalkyl carboxylic acid, and separating the precipitate.

3. A method for the recovery of perchlorofluoroalkyl carboxylic acid having the formula $$Z(CF_2—CFCl)_{n-1}CF_2COOH$$

wherein Z is a member of the group consisting of a carboxylic acid radical and a perhalomethyl radical having a total atomic weight not in excess of 146.5 and $n$ is an integer from 2 to 16, from a dilute aqueous solution containing at least 98 percent by weight of water which comprises adding to said dilute aqueous solution a member of the group consisting of sulfuric and phosphoric acid in sufficient quantity to form a solution of about 1 to 10 percent by weight of added acid, thereby percipitating the perchlorofluoroalkyl carboxylic acid, and separating the precipitate.

4. A method for the recovery of perchlorofluoroalkyl carboxylic acid having the formula $$Z—CFCl(CF_2—CFCl)_{n-2}CF_2COOH$$

wherein Z is a member of the group consisting of a carboxylic acid radical and a perhalomethyl radical having a total atomic weight not in excess of 146.5 and $n$ is an integer from 2 to 16, from a dilute aqueous solution containing at least 98 percent by weight of water which comprises adding to said dilute aqueous solution a member of the group consisting of sulfuric and phosphoric acid in sufficient quantity to form a solution of about 1 to 10 percent by weight of added acid, thereby precipitating the perchlorofluoroalkyl carboxylic acid, and separating the precipitate.

5. A method for the recovery of a perchlorofluoroalkyl carboxylic acid having from 4 to about 20 carbon atoms from a dilute solution containing at least 98 percent by weight of water which comprises adding to said dilute aqueous solution a member of the group consisting of sulfuric and phosphoric acid in sufficient quantity to form a solution of about 1 to 10 percent by weight of added acid, thereby precipitating the perchlorofluoroalkyl carboxylic acid, and separating the precipitate.

6. The method of claim 5 in which the added acid is sulfuric acid.

7. The method of claim 5 in which the added acid is phosphoric acid.

8. The method of claim 5 in which the precipitate is separated by centrifugation.

9. The method of claim 5 in which the precipitate is separated by solvent extraction.

References Cited in the file of this patent

UNITED STATES PATENTS 2,559,629    Berry _____ July 10, 1951